United States Patent Office 3,186,798
Patented June 1, 1965

3,186,798
METHOD OF AND MATERIAL FOR
IDENTIFYING METALS
Francis W. Juchnicki, 118 Munson St., and William A. Merriam, 59 Shattuck St., both of Greenfield, Mass.
No Drawing. Filed Dec. 7, 1961, Ser. No. 157,844
6 Claims. (Cl. 23—230)

This invention relates to a method of and a material for identifying certain metals, particularly those of the lightweight, non-ferrous category, and has as its primary object the provision of a composition of matter and a method of applying and utilizing the same so that such lightweight non-ferrous metals may be readily identified by a welder in order that the proper type of welding material and procedure may be employed.

As conducive to a clearer understanding of this invention, it may here be pointed out that in welding metals of the non-ferrous light metal type which basically include magnesium and its alloys, zinc-base die-cast alloys, and aluminum and its alloys, it is important that the type of metal to be welded be known to the welder, in order that the proper type of weld to afford maximum strength and efficacy may be employed. Heretofore, in many instances, such knowledge has not been readily available to the welder, and since the outer appearance of all of these metals and their alloys is similar, if not identical, it has been difficult to determine the proper weld except by trial and error. A primary object of this invention is, therefore, the provision of an improved compound which is adapted to be applied directly to the metal to be welded, which will react in a different way to aluminum, zinc and magnesium and their alloys in order that, by observation of the reaction, the welder may determine immediately and positively the proper weld to employ.

Applicants have discovered a composition of matter which when applied to the three above-mentioned metals and any of their alloys will react in a different fashion to each metal, thus permitting immediate and positive identification of the base metal of the particular material to be welded.

A preferred embodiment of this composition comprises:

One part copper sulphate ($CU_2SO_4$)
Eight parts ammonium chloride ($NH_4Cl$)
Twenty parts zinc chloride ($ZnCl_2$)
Twenty-nine parts water ($H_2O$)

or more broadly approximately 3.3% copper sulphate ($CU_2SO_4$)
18.5% ammonium chloride ($NH_4Cl$)
28.2% zinc chloride ($ZnCl_2$)
50.0% water ($H_2O$)

The several ingredients are mixed to form a solution, and a single drop is applied to a freshly cleaned and scraped surface of the metal to be welded. On an aluminum alloy the material will show no effect. However, one drop applied to a freshly cleaned and scraped surface of a magnesium alloy will boil, and be black in color in less than ten seconds. A drop applied to a freshly filed or ground surface of any type zinc-base die-cast material will result in a dark brown spot in approximately ten seconds.

Thus, any repairman who has occasion to weld any of these alloys will be able immediately to identify and segregate each in order to enable him to use proper welding procedure and filler material.

From the foregoing it will now be seen that there is herein provided an improved method of and composition for predetermining a metal be be welded which applies to any of the non-ferrous lightweight variety metals, and which accomplishes all the objects of this invention, and others, including many advantages of great practical utility and commercial importance.

As various minor variations in the composition and various modifications in the steps of the process may be made, it is to be understood that all matter hereinbefore described is to be interpreted merely as illustrative, and not in a limiting sense.

We claim:
1. A method of determining the basic component of a lightweight non-ferrous metal selected from the group consisting of alluminum, magnesium, zinc and alloys of the same comprising the steps of cleaning and scraping a portion of the metal, applying to said portion an aqueous solution of copper sulphate, ammonium chloride and zinc chloride, said solution having substantially no effect on an aluminum-bearing metal, boiling violently and producing a black spot on a magnesium-bearing metal, and producing a brown spot on a zinc-bearing metal.

2. A method in accordance with claim 1 wherein said solution includes, by weight, approximately one part copper sulphate, approximately eight parts ammonium chloride, approximately twenty parts zinc chloride and approximately twenty-nine parts water.

3. A method in accordance with claim 1 wherein said solution includes, by weight, approximately 3.3 percent copper sulphate, approximately 18.5 percent ammonium chloride, approximately 28.2 percent zinc chloride, and approximately 50.0 percent water.

4. A composition of matter for determining the basic component of a lightweight non-ferrous metal selected from the group consisting of aluminum, magnesium, zinc and alloys of the same, comprising an aqueous solution of copper sulphate, ammonium chloride and zinc chloride.

5. A composition of matter in accordance with claim 4 wherein said solution includes, by weight, approximately one part copper sulphate, approximately eight parts ammonium chloride, approximately twenty parts zinc chloride and approximately twenty-nine parts water.

6. A composition of matter in accordance with claim 4 wherein said solution includes, by weight, approximately 3.3 percent copper sulphate, approximately 18.5 percent ammonium chloride, approximately 28.2 percent zinc chloride and approximately 50.0 percent water.

References Cited by the Examiner
UNITED STATES PATENTS
1,480,869   1/24   Thomas _____ 148—6.27 XR OTHER REFERENCES
Mellor: Comprehensive Treatise on Inorganic and Theoretical Chemistry, vol. 4, pp. 269, 272, 273, 475 and 490, Longmans, Green and Co., New York, 1923.
Ibid., vol. 5, p. 220, 1925.

MORRIS O. WOLK, Primary Examiner.
ANTHONY SCIAMANNA, Examiner.